United States Patent [19]

Kobayashi et al.

[11] Patent Number: 5,137,993
[45] Date of Patent: Aug. 11, 1992

[54] RADICAL POLYMERIZABLE COMPOSITION

[75] Inventors: Masao Kobayashi; Reiko Otsuka, both of Tokyo, Japan

[73] Assignee: Showa Denko K.K., Tokyo, Japan

[21] Appl. No.: 525,810

[22] Filed: May 18, 1990

Related U.S. Application Data

[62] Division of Ser. No. 160,431, Feb. 25, 1988, Pat. No. 4,962,158.

[30] Foreign Application Priority Data

Feb. 25, 1987 [JP] Japan ................... 62-41265
Feb. 12, 1988 [JP] Japan ................... 63-30583

[51] Int. Cl.$^5$ .............................. H01B 1/00
[52] U.S. Cl. ........................ 525/540; 252/500
[58] Field of Search ......................... 525/540

[56] References Cited

U.S. PATENT DOCUMENTS

| | | | |
|---|---|---|---|
| 4,544,732 | 10/1985 | Corley | 525/502 |
| 4,579,931 | 4/1986 | Corley | 525/502 |
| 4,617,353 | 10/1986 | Myers | 525/245 |
| 4,629,540 | 12/1986 | Genie,e,gra/e/ s et al. | 528/422 |
| 4,657,985 | 4/1987 | Druy et al. | 525/390 |
| 4,665,129 | 5/1987 | Naarmann et al. | 525/186 |
| 4,798,685 | 1/1989 | Yaniger | 525/540 |
| 4,806,271 | 2/1989 | Yaniger et al. | 525/540 |
| 4,962,158 | 10/1990 | Kobayashi et al. | 525/279 |

FOREIGN PATENT DOCUMENTS

| | | |
|---|---|---|
| 0157257 | 10/1985 | European Pat. Off. . |
| 0181587 | 5/1986 | European Pat. Off. . |
| 0203438 | 12/1986 | European Pat. Off. . |
| 0241728 | 10/1987 | European Pat. Off. . |

Primary Examiner—Ana L. Carrillo
Assistant Examiner—W. R. M. Clark
Attorney, Agent, or Firm—Sughrue, Mion, Zinn, Macpeak & Seas

[57] ABSTRACT

A radical polymerizable composition comprising
(A) a compound having a pi-electron conjugated structure and
(B) a radical polymerizable compound, which is useful for molding into an arbitrary shape, which can be rendered electrically conductive and which is, therefore, useful as a material for electrodes or circuits in the electrical and electronic industry.

10 Claims, No Drawings

RADICAL POLYMERIZABLE COMPOSITION

This is a divisional of application No. 07/160,431 filed Feb. 25, 1988, now U.S. Pat. No. 4,962,158.

FIELD OF THE INVENTION

This invention relates to a radical polymerizable composition suitable as materials for use in electrical and electronic fields, e.g., materials for electrodes of capacitance video discs, batteries, condensers and display elements, materials for electrochromic display elements, circuit materials of printed circuit boards and the like.

BACKGROUND OF THE INVENTION

Requirements for various conductive materials to be used in the electric and electronic industry are becoming more severe. Development of conductive materials which would achieve a reduction in weight and size of parts and exhibit long-term stability and high performance properties has long been demanded.

In order to cope with these increasing requirements, extensive research has recently been conducted on electrically conductive high polymers in place of the conventional carbonaceous or metallic materials. Many proposals on use of such high polymers have also been made. Conductive high polymers so far proposed include heterocyclic high polymers, such as polythiophene, polypyrrole, etc., as described in U.S. Pat. Nos. 4,543,402, 4,547,270, 4,552,927, 4,548,696 and 4,657,985, and they have been suggested as applicable to electrodes for secondary batteries or electrochromic display elements.

However, many of these heterocyclic high polymers are insoluble or infusible. Therefore, they have such poor molding processability that they have not been employed practically. In order to overcome this problem, various techniques have recently been proposed. For example, *J. C. S., Chem. Commum.*, p. 817 (1984) discloses a method for obtaining a uniform composite film composed of polypyrrole and a thermoplastic resin, such as polyvinyl chloride, in which the surface of an anode base is previously coated with a thermoplastic resin film before polypyrrole is produced by electrolytic polymerization. European Patent Application No. 160207A discloses that electrolytic polymerization of pyrrole is carried out in the presence of a polymer latex having anionic surface characteristics to obtain a conductive high polymer composite material with improved processability. Similar methods are also disclosed in U.S. Pat. Nos. 4,582,575, 4,604,427, 4,617,353, and 4,617,228. Further, *Synthetic Metals*, Vol. 15, p. 169 (1986) teaches introduction of a long chain alkyl group into insoluble and infusible heterocyclic high polymers t thereby obtain organic solvent-soluble heterocyclic high polymers which can be molded into a coating film on an appropriate base. As exemplified by the above-mentioned techniques, the conventional proposals describe how to combine a previously polymerized resin and a conductive high polymer to obtain a composite film.

However, a composite material of a previously polymerized resin and a conductive high polymer is nothing but a polymer blend. It is difficult to form a microscopically uniform composite film. In other words, it is difficult to obtain a composite film having high electric performance characteristics.

In the electric and electronic industry, it has recently become widespread to coat a radical polymerizable compound and polymerize it by irradiation with, for example, ultraviolet radiation to thereby effect minute processing. However, the above-described composite formation techniques have difficulties in minute processing unless extremely complicated steps are involved and, moreover, the resolving power attained has its limit.

SUMMARY OF THE INVENTION

An object of this invention is to provide a radical polymerizable composition which can be molded into an arbitrary shape and can be rendered electrically conductive.

The above object of this invention is accomplished by a radical polymerizable composition comprising
  (A) a compound having a pi-electron conjugated structure and
  (B) a radical polymerizable compound.

The Compound having a pi-electron conjugated structure according to the present invention is a compound having a repeating unit represented by formula (I) or (II):

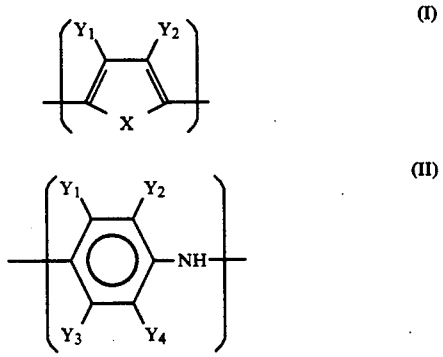

wherein X represents NH, S, O, Se Or Te; $Y_1$, $Y_2$, $Y_3$, and $Y_4$, which may be the same or different, each represents a hydrogen atom, a substituted or unsubstituted alkyl group having from 1 to 12 carbon atoms, an alkoxy group, an alkoxycarbonyl group, an aryloxycarbonyl group, an alkoxysulfonyl group, an aryloxysufonyl group, or an amido group; and the parentheses indicate repeating units.

DETAILED DESCRIPTION OF THE INVENTION

In formulae (I) and (II), the alkyl group for $Y_1$ to $Y_4$ is a straight or branched chain alkyl group with or without a substituent such as an alkoxycarbonyl group, an aryloxycarbonyl group, an alkoxysulfonyl group, an aryloxysulfonyl group, or an amido group (e.g., a monoalkylamido group, a dialkylamido group, and a monoarylamido group). The alkyl group has from 1 to 12 carbon atoms, preferably from 4 to 12 carbon atoms, and more preferably from 6 to 10 carbon atoms (including the number of carbon atoms in the substituent if any). When the alkyl group is substituted with an alkoxy- or aryloxycarbonyl group, an alkoxy- or aryloxysulfonyl group, or an amido group, the substituted alkyl group preferably has from 3 to 8 carbon atoms. Examples of the alkyl group include $-C_6H_{13}$, $-C_8H_{17}$, $-C_{10}H_{21}$, $-CH_2CH_2COOCH_3$, $-CH_2CH_2-SO_3CH_3$, and $-CH_2CH_2CONHCH_3$. The alkoxy group for $Y_1$ to $Y_4$ has a straight or branched chain alkyl moiety preferably having from 1 to 4 carbon atoms such as —$OCH_3$ and —$OC_2H_5$. Examples of the other groups for $Y_1$ to $Y_4$ include —$COOCH_3$, —$SO_3CH_3$, etc. Of these groups for $Y_1$ to $Y_4$, preferred are a hydrogen atom, a substituted or unsubstituted alkyl group, and an alkoxy group.

Preferred for X in formula (I) are —NH— and —S—.

The compound having a pi-electron conjugated structure may have two or more repeating units represented by formula (I), or two or more repeating units represented by formula (II). Further, the compound having a repeating unit(s) of formula (I) may be used as a mixture with that having a repeating unit(s) of formula (II).

The compound having a pi-electron conjugated structure preferably has an average degree of polymerization (the number of the repeating unit) of from 5 to 10,000, more preferably from 50 to 10,000 and most preferably from 100 to 1,000, provided that, when $Y_1$, $Y_2$, $Y_3$, and $Y_4$ in the repeating unit of formula (I) or (II) are a hydrogen atom and/or an unsubstituted alkyl group having 1 to 3 carbon atoms, the average degree of polymerization preferably ranges from 5 to less than 50 and more preferably from 8 to 20.

Preferred terminal groups in the compound having the repeating unit of formula (I) or (II) are monovalent groups derived from the groups represented by formula (I) or (II), respectively, such as

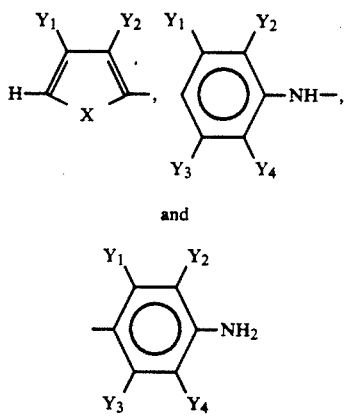

wherein X, $Y_1$, $Y_2$, $Y_3$, and $Y_4$ are defined above.

Of the compounds having a repeating unit represented by formulae (I) or (II), preferred compounds are those soluble in radical polymerizable compounds or organic solvents, for example, oligomers of thiophene, pyrrole, aniline, etc., heterocyclic high polymers having various substituents introduced therein, and polyaniline having various substituents introduced therein. The most preferred of them are poly[2,5-thienylene-3-(methyl 2-ethanesulfonate)], poly(2,5-dimethoxyaniline), poly(3-hexyl-2,5-thienylene), poly(3-methoxythiophene), and poly[2,5-pyrrole-1-(methyl-2-butanesulfonate)].

The compound having a pi-electron conjugated structure can be produced by conventional methods such as electrolytic polymerization described, for example, in U.S. Pat. Nos. 4,552,927, 4,548,696 and 4,582,575, as well as chemical polymerization described in U.S. Pat. Nos. 4,604,427, 4,617,353, and 4,617,228.

These compounds having a pi-electron conjugated structure can be rendered conductive by subjecting a part of the compound to oxidation or reduction, i.e., doping. Suitable techniques for accomplishing such are described, e.g., in Kagaku Zokan, Vol. 87, "Gosei Kinzoku", Kagaku Dojin K.K. and Handbook of Conducting Polymers, Vol. 1 chapter 2, p. 45-79, Marcel Dekker Inc. (1986).

The doping can be effected either chemically or electrochemically. In chemical doping, various known electron accepting compounds or electron donating compounds can be used as a dopant, such as (i) halogens, e.g., iodine, bromine, and bromine iodide, (ii) metal halides, e.g., arsenic pentafluoride, antimony pentafluoride, silicon tetrafluoride, phosphorus pentachloride, phosphorus pentafluoride, aluminium chloride, aluminium bromide, and aluminium fluoride, (iii) protonic acids e.g., sulfuric acid, nitric acid, fluorosulfuric acid, trifluoromethanesulfuric acid, and chlorosulfuric acid, (iv) oxidants, e.g., sulfur trioxide, nitrogen dioxide, and difluorosulfonyl peroxide, (v) $AgClO_4$ (vi) tetracyanoethylene, tetracyanoquinodimethane, chloranil, 2,3-dichloro-5,6-dicyano-p-benzoquinone, and 2,3-dibromo 5,6-dicyano-p-benzoquinone, and (vii) alkali metals, e.g., Li, Na, and K. In electrochemical doping, examples of dopant include (i) anion dopants such as halide anions of the Va or IIIa Groups elements, (e.g., $PF_6^-$, $SbF_6^-$, $AsF_6^-$, $SbCl_6^-$ and $BF_4^-$), halogen anions (e.g., $I^-(I_3^-)$, $Br^-$, and $Cl^-$), and perchlorate anions (e.g., $ClO_4^-$) and (ii) cation dopants such as alkali metal ions (e.g., $Li^+$, $Na^+$, $K^+$, $Rb^+$ and $Cs^+$), and cations represented by $R_{4-x}M^+H_x$ or $R_3M'^+$ (wherein R is an alkyl group of 1 to 10 carbon atoms or an aryl group (e.g., a phenyl group, a halophenyl group, and an alkylphenyl group), M is N, P, or As, M' is O or S, and x is 0 or 1) (e.g., tetraalkylammonium, tetraalkylphosphonium, tetraalkylarsonium, trialkyloxonium, and trialkylsulfonium). In the present invention, however, dopants are not limited thereto.

The content of dopant in the compound having a pielectron conjugated structure is not particularly limited, but it is preferably from 0.05 to 1, more preferably from 0.1 to 0.4, per one repeating unit. By the doping operation the compound having a pi-electron conjugated structure can exhibit a direct current electroconductivity of more than $10^{-5}$ S/cm and preferably more than $10^{-3}$ S/cm.

The radical polymerizable compound which can be used in the present invention include various ethylene derivatives, e.g., as described in Jugo Han-noron Koza, Vol. 1, "Radical Polymerization (I)", pp. 5-9, such as styrene derivatives (e.g., styrene, divinylbenzene and p-chloromethylstyrene); acryltes (e.g., methyl acrylate, epoxy acrylate, and trimethylolpropane triacrylate); methacrylates (e.g., methyl methacrylate and epoxy methacrylate); allyl compounds and allylidene compounds (e.g., diallylidene pentaerythritol and allyl chloride); vinylamides, vinylimides, vinyllactams, and vinylcarbazoles (e.g., N-vinylpyrrolidone); and acrylamides (e.g., acrylamide and methacrylamide). Of these, acrylates are preferred, and epoxy acrylates are particularly preferred. These radical polymerizable compounds may be used either individually or as combinations of two or more thereof.

The mixing ratio of the compound having a pielectron conjugated structure and the radical polymerizable compound is not particularly limited. In order to ensure sufficient characteristics, it is desirable that the compound having a pi-electron conjugated structure of the present invention is contained in an amount of from 5 to 50% by weight, more preferably from 10 to 30% by weight, based on the total weight of the compound having a pi-electron conjugated structure and the radical polymerizable compound.

The method for mixing the components is not particularly restricted. It is desirable for the compound having a pi-electron conjugated structure to be dispersed as uniformly as possible in the composition. To this effect, the mixing may be carried out in a molten state under heating or in the presence of an appropriate solvent in which the components are homogenized and the solvent is then removed. In the latter case, polymerization may be effected without removing the solvent. Examples of the solvent include chloroform, methylene chloride, chlorobenzene, tetrahydrofuran, N-methylpyrrolidone, N,N-dimethylformamide, dimethylsulfoxide, and propylene carbonate.

The radical polymerizable composition may contain conventional additives, for example, a radical polymerization initiator such as peroxides (e.g., hydrogen peroxide, benzoyl peroxide, ammonium persulfate, and cumene hydroperoxide), azo compounds (e.g., azobisisobutyronitrile and azodibenzoyl), and carbonyl compounds (e.g., benzophenone and benzoin isopropyl ether); and a radical polymerization promoter such as amines capable of promoting decomposition of peroxides (e.g., N,N-dimethylaminoethanol and dimethylaniline).

The radical polymerizable composition according to the present invention can be applied to surfaces of various solid bases, such as metals, semiconductors, synthetic resins, ceramics, paper, fibers, and the like, by coating, spraying, deposition, or like technique to form a coating film. The composition of the invention can also be cast and dried in either a batch system or a continuous system to produce a film of any desired thickness. Further, the composition may be polymerized in a mold of various shapes to produce molded articles.

The radical polymerizable composition of the present invention can be polymerized by using various sources of energy such as heat, ultraviolet rays, electron rays, X-rays, etc., without any particular limitations. Polymerization with ultraviolet or electron radiation is suitably employed because of easy operation and satisfactory resolving power attained in pattern formation.

The radical polymerizable composition of the present invention may be rendered conductive by doping, either before polymerization or after polymerization. It should be noted, however, that many compounds having a pielectron conjugated structure tend to have their solubility in solvents reduced upon doping so that the latter manner, i.e., polymerization followed by doping is preferred for obtaining polymers having satisfactory electrical characteristics.

The radical polymerizable composition according to the present invention can be used as a material of electrodes of capacitance video discs. Although there is a fine roughness on the surface of video discs, a replica of high precision can be prepared using the composition of the present invention due to its satisfactory fluidity. In addition, photocuring techniques can be applied to the composition to greatly increase productivity as compared with the conventional methods.

Use of the radical polymerizable composition of the invention also makes it possible to form a circuit of a minute pattern directly from a conductive polymer by utilizing the photoresist technique.

Further, when the composition of the invention is applied to electrochromic display elements, pattern formation can be carried out easily and the resulting display elements have improved durability because of a small rate of elution.

The radical polymerizable composition according to the present invention is characterized by its satisfactory processability and can be used in a variety of applications taking advantage of its characteristics.

The present invention is now illustrated in greater detail with reference to Examples, but it should be understood that the present invention is not deemed to be limited thereto. Unless otherwise indicated herein, all parts, percents, ratios and the like are by weight.

EXAMPLE 1

One gram of thiophene oligomer (average degree of polymerization: about 12) was dissolved under heating in a mixture consisting of 5 g of an epoxy acrylate resin ("Ripoxy sp-1509" produced by Showa Kobunshi K.K.), 4 g of trimethylolpropane triacrylate ("NK ESTER TMPT" produced by Shin-nakamura Kagaku Kogyo K.K.), 1 g of N-vinyl-2-pyrrolidone, 0.2 g of benzophenone (radical polymerization initiator), and 0.2 g of N,N-dimethylaminoethanol (radical polymerization promoter) to prepare a uniform deep red solution.

The resulting solution was coated on a ITO glass plate (Indium-Tin-Oxide coated glass; prepared by vapor-depositing on a glass plate indium oxide with tin dopant) to a film thickness of 10 $\mu$m and irradiated with ultraviolet light in air using a high-pressure mercury lamp (output: 75 W/cm) to prepare a coated electrode.

An electrochemical cell was constructed from the coated electrode as a working electrode, a platinum plate as an opposing electrode, a silver/silver ion electrode as a reference electrode, and a 1.0 mol/l solution of tetraethylammonium perchlorate in acetonitrile.

When a potentiostat was connected to the cell, and electrochemical doping was carried out at a potential of +0.8 V based on the reference electrode, the deep red cured film turned deep blue. The coated electrode was then removed from the cell, thoroughly washed with acetonitrile, and stripped from the ITO glass plate. The surface resistivity of the cured film was found to be 530 $\Omega$sq.

EXAMPLE 2

One gram of poly[2,5-thienylene-3-(methyl 2-ethanesulfonate] (average degree of polymerization: about 50) was poured into a solution of 1.0 g of nitrosyl hexafluorophosphate in 10 ml of nitromethane to effect chemical doping with $PF_6^-$, whereby a deep blue solution was obtained. The solution was uniformly mixed with a mixture having the same composition as used in Example 1, except that no thiophene oligomer was used, and the nitromethane was removed therefrom by distillation under reduced pressure.

The resulting mixture was coated on a glass slide to form a thin film and irradiated with ultraviolet light in the same manner as in Example 1 to prepare a cured film. The film was found to have a surface resistivity of 360 $\Omega$/sq.

EXAMPLE 3

One gram of an aniline oligomer (average degree of polymerization: about 8) was dissolved in 10 ml of N,N-dimethylformamide. The solution was mixed with a mixture having the same composition as in Example 1, except that no thiophene oligomer was present, to form a uniform solution. The dimethylformamide was removed therefrom by distillation under reduced pressure.

The resulting composition was coated on a glass slide and irradiated with ultraviolet light in the same manner as in Example 1 to obtain a cured film. When hydrogen chloride gas was applied to the cured film, the film changed from a blackish blue to green and had a surface resistivity of 2.3 kΩ/sq.

EXAMPLE 4

One gram of poly(2,5-dimethoxyaniline) (average degree of polymerization: about 50) was dissolved in 10 ml of acetonitrile. The solution was mixed with a mixture having the same composition as in Example 1 except that the thiophene oligomer was not present, and the resulting composition was coated and cured, followed by doping, in the same manner as in Example 3. The resulting cured film had a bluish green color and a surface resistivity of 5.0 kΩ/sq.

EXAMPLE 5

Five grams of poly(3-hexyl-2,5-thienylene) (average degree of polymerization: about 500) was dissolved under heating in a mixture consisting of 10 g of an epoxy acrylate resin ("Ripoxy R-806" produced by Showa Kobunshi K.K.) and 20 g of styrene to prepare a uniform red solution. 1.5 g of benzoin isopropyl ether (radical polymerization initiator) was further added to the solution.

The resulting solution was coated on a glass slide in a thickness of 20 μm and irradiated with ultraviolet light in air using a high-pressure mercury lamp (output: 75 W/cm) to prepare a cured film. Then, the cured film was exposed to iodine vapor to effect doping. The surface resistivity of the film was 150 Ω/sq.

EXAMPLE 6

1.5 g of poly(2,5-dimethoxyaniline) (average degree of polymerization: about 100) doped with p-toluenesulfonic acid was mixed under heating with a spiroacetal resin ("Spilac N-4N-7" produced by Showa Kobunshi K.K.), to which 0.2 g of benzoin isopropyl ether was further added to prepare a uniform solution.

Using the resulting solution, the same procedure as in Example 5 was repeated to obtain a doped cured film having a surface resistivity of 750 Ω/sq.

While the invention has been described in detail and with reference to specific embodiments thereof, it will be apparent to one skilled in the art that various changes and modifications can be made therein without departing from the spirit and scope thereof.

What is claimed is:

1. A radical polymerizable composition comprising
   (A) a compound having a pi-electron conjugated structure with a repeating unit represented by formula (II)

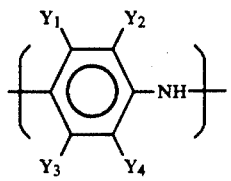

(II)

wherein $Y_1$, $Y_2$, $Y_3$ and $Y_4$, which may be the same or different, each represents a hydrogen atom, a substituted or unsubstituted alkyl group having from 1 to 12 carbon atoms, an alkoxys group, an alkoxycarbonyl group, an aryloxycarbonyl group, an alkoxysulfonyl group, an aryloxysulfonyl group or an amido group; and the parenthesis indicate a repeating unit, and the number of repeating units in said compound (A) ranges from 5 to 10,000 and
   (B) a radical polymerizable compound.

2. A radical polymerizable composition as claimed in claim 1, wherein said compound (A) is an aniline oligomer or poly(2,5-dimethoxyaniline).

3. A radical polymerizable composition as claimed in claim 2, wherein said compound (A) is poly(2,5-dimethoxyaniline) represented by the formula:

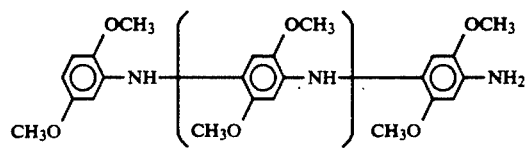

wherein the parentheses indicate a repeating unit.

4. A radical polymerizable composition as claimed in claim 1, wherein $Y_1$, $Y_2$, $Y_3$, and $Y_4$, each represents a hydrogen atom, a substituted or unsubstituted alkyl group having from 3 to 12 carbon atoms, or an alkoxy group having from 1 to 4 carbon atoms.

5. A radical polymerizable composition as claimed in claim 1, wherein the number of repeating units in said compound (A) ranges from 50 to 10,000, provided that, when $Y_1$, $Y_2$, $Y_3$, and $Y_4$ in the repeating unit of formula (II) are a hydrogen atom and/or an unsubstituted alkyl group having from 1 to 3 carbon atoms, the number of repeating units ranges from 5 to less than 50.

6. A radical polymerizable composition as claimed in claim 1, wherein said compound (B) is styrene, epoxyacrylate, diallylidene pentaerythritol, epoxy methacrylate, trimethylolpropane triaacrylate, methyl methacrylate, N-vinylpyrrolidone, or a mixture thereof.

7. A radical polymerizable composition as claimed in claim 1, wherein said compound (A) is present in an amount of from 5 to 50% by weight based on the total weight of said compound (A) and said compound (B).

8. A radical polymerizable composition as claimed in claim 7, wherein said compound (A) is present in an amount of from 10 to 30% by weight based on the total weight of said compound (A) and said compound (B).

9. A radical polymerizable composition comprising:
   (A) a compound having a pi-electron conjugated structure with a repeating unit represented by formula (II)

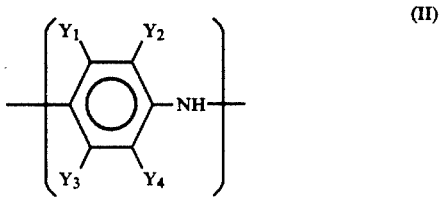

(II)

wherein $Y_1$, $Y_2$, $Y_3$, and $Y_4$, which may be the same or different, each represents a hydrogen atom, a substituted or unsubstituted alkyl group having from 1 to 12 carbon atoms, an alkoxy group, an alkoxycarbonyl group, an aryloxycarbonyl group, an alkoxysulfonyl group, an aryloxysulfonyl group or an amide group; and the parenthesis indicate a repeated unit; and the number of repeating units in said compound (A) ranges from 5 to 10,000;

(B) a radical polymerizable compound; and (c) a radical polymerization initiator.

10. A radical polymerizable composition as claimed in claim 9, wherein said radical polymerization initiator is selected from the group consisting of a peroxide, an azo compound and a carbonyl compound.

* * * * *